(12) United States Patent
Reibel et al.

(10) Patent No.: US 8,155,105 B2
(45) Date of Patent: Apr. 10, 2012

(54) SPREAD SPECTRUM WIRELESS COMMUNICATION AND MONITORING ARRANGEMENT AND METHOD

(75) Inventors: Jean-Michel Reibel, Strasbourg (FR); Keith A. Jentoft, Circle Pines, MN (US)

(73) Assignee: RSI Video Technologies, Inc., White Bear Lake, MN (US)

( * ) Notice: Subject to any disclaimer, the term of this patent is extended or adjusted under 35 U.S.C. 154(b) by 1364 days.

(21) Appl. No.: 11/389,674

(22) Filed: Mar. 24, 2006

(65) Prior Publication Data

US 2007/0066311 A1    Mar. 22, 2007

Related U.S. Application Data

(60) Provisional application No. 60/719,369, filed on Sep. 22, 2005.

(51) Int. Cl.
| H04J 3/06 | (2006.01) |
| G08C 17/00 | (2006.01) |
| H04M 1/00 | (2006.01) |
| H04B 7/00 | (2006.01) |
| G05B 23/02 | (2006.01) |
| G08B 1/08 | (2006.01) |

(52) U.S. Cl. ....... 370/350; 370/311; 455/574; 455/41.2; 340/3.21; 340/539.17; 340/539.3

(58) Field of Classification Search .................. 455/423, 455/424, 425, 522, 572, 574, 41.2; 340/3.2, 340/3.1, 3.21, 539.16, 539.17, 539.21, 539.22, 340/539.25, 539.3, 540, 541, 545.1; 370/347, 370/350, 328, 329, 330, 336, 337, 338, 311

See application file for complete search history.

(56) References Cited

U.S. PATENT DOCUMENTS

| 4,821,262 | A | * | 4/1989 | Futami | 370/212 |
| 4,857,912 | A | | 8/1989 | Everett, Jr. et al. | |
| 5,068,850 | A | * | 11/1991 | Moore | 370/449 |
| 5,436,905 | A | * | 7/1995 | Li et al. | 370/346 |
| 5,448,290 | A | | 9/1995 | Van Zeeland | |
| 5,473,368 | A | | 12/1995 | Hart | |
| 5,568,482 | A | * | 10/1996 | Li et al. | 370/471 |
| 5,574,979 | A | * | 11/1996 | West | 455/63.1 |

(Continued)

FOREIGN PATENT DOCUMENTS

DE    101 50 745 A1    4/2003

(Continued)

OTHER PUBLICATIONS

Shrenharsha Rao, SWRA041: Implementing a Bidirectional Frequency Hopping Application With TRF6903 and MSP430, Sep. 2004, Texas Instruments.*

(Continued)

*Primary Examiner* — Christopher M Brandt
(74) *Attorney, Agent, or Firm* — Crawford Maunu PLLC

(57) ABSTRACT

A method and system for wireless monitoring is implemented in a variety of embodiments. In one such embodiment, a monitoring system method is implemented for, wireless communication between a central device and monitoring devices. Each of the devices includes a wireless communication circuit to effect wireless communications. Power consumption from a limited power source is reduced at least one of the wireless communication circuits based upon a communications time interval and a selected channel for communication between the central device and a monitor device to effect wireless communications between the central device and the monitor device.

26 Claims, 9 Drawing Sheets

U.S. PATENT DOCUMENTS

| | | | |
|---|---|---|---|
| 5,703,368 A | 12/1997 | Tomooka et al. | |
| 5,819,124 A | 10/1998 | Somner et al. | |
| 5,832,384 A * | 11/1998 | Balachandran et al. | 455/450 |
| 6,169,732 B1 * | 1/2001 | Hetherington et al. | 370/335 |
| 6,188,715 B1 * | 2/2001 | Partyka | 375/134 |
| 6,223,048 B1 * | 4/2001 | Noll Barreto et al. | 455/517 |
| 6,271,752 B1 | 8/2001 | Vaios | |
| 6,323,784 B1 * | 11/2001 | Miyashita | 340/7.2 |
| 6,411,209 B1 | 6/2002 | Lyons et al. | |
| 6,414,955 B1 * | 7/2002 | Clare et al. | 370/390 |
| 6,476,858 B1 | 11/2002 | Ramirez Diaz et al. | |
| 6,504,479 B1 | 1/2003 | Lemons et al. | |
| 6,603,799 B1 * | 8/2003 | Hlasny | 375/132 |
| 6,683,919 B1 * | 1/2004 | Olgaard et al. | 375/316 |
| 6,690,414 B2 | 2/2004 | Lyons et al. | |
| 6,700,487 B2 | 3/2004 | Lyons et al. | |
| 6,759,957 B2 | 7/2004 | Murakami et al. | |
| 6,804,542 B1 * | 10/2004 | Haartsen | 455/574 |
| 6,925,105 B1 * | 8/2005 | Partyka | 375/133 |
| 6,983,243 B1 * | 1/2006 | Goyal et al. | 704/222 |
| 6,999,773 B2 * | 2/2006 | Nguyen et al. | 455/450 |
| 7,180,903 B1 * | 2/2007 | Haartsen | 370/442 |
| 7,392,053 B1 * | 6/2008 | Conner et al. | 455/445 |
| 7,420,149 B2 * | 9/2008 | Goldberg et al. | 250/208.1 |
| 7,436,789 B2 * | 10/2008 | Caliskan et al. | 370/310.1 |
| 7,496,059 B2 * | 2/2009 | Yoon | 370/311 |
| 7,522,688 B2 * | 4/2009 | Shemesh et al. | 375/356 |
| 7,664,162 B1 * | 2/2010 | Lavelle et al. | 375/141 |
| 2001/0004375 A1 * | 6/2001 | Partyka | 375/135 |
| 2002/0005781 A1 * | 1/2002 | Britton | 340/540 |
| 2002/0055334 A1 * | 5/2002 | Simmons | 455/63 |
| 2002/0075941 A1 * | 6/2002 | Souissi et al. | 375/133 |
| 2002/0159434 A1 * | 10/2002 | Gosior et al. | 370/350 |
| 2002/0164990 A1 * | 11/2002 | Balachandran et al. | 455/450 |
| 2002/0171557 A1 | 11/2002 | Wegener | |
| 2003/0031231 A1 * | 2/2003 | You et al. | 375/133 |
| 2003/0065407 A1 | 4/2003 | Johnson et al. | |
| 2003/0103475 A1 * | 6/2003 | Heppe et al. | 370/321 |
| 2003/0193563 A1 | 10/2003 | Suzuki | |
| 2003/0202117 A1 | 10/2003 | Garner | |
| 2004/0046661 A1 | 3/2004 | Vaccaro et al. | |
| 2004/0109059 A1 | 6/2004 | Kawakita | |
| 2004/0128091 A1 * | 7/2004 | Delin et al. | 702/75 |
| 2004/0131014 A1 * | 7/2004 | Thompson et al. | 370/230 |
| 2004/0155781 A1 | 8/2004 | DeOme | |
| 2004/0189244 A1 * | 9/2004 | Karapetyan et al. | 320/101 |
| 2004/0203808 A1 * | 10/2004 | Mathur | 455/450 |
| 2004/0205823 A1 | 10/2004 | Tsai | |
| 2004/0205824 A1 | 10/2004 | Tsai | |
| 2004/0239497 A1 * | 12/2004 | Schwartzman et al. | 340/539.1 |
| 2004/0264397 A1 * | 12/2004 | Benveniste | 370/311 |
| 2005/0024206 A1 | 2/2005 | Samarasekera et al. | |
| 2005/0030927 A1 * | 2/2005 | Mucke | 370/336 |
| 2005/0041613 A1 * | 2/2005 | Kuhl et al. | 370/320 |
| 2005/0043024 A1 * | 2/2005 | Shiga | 455/428 |
| 2005/0083902 A1 * | 4/2005 | Hashimoto | 370/349 |
| 2005/0091051 A1 * | 4/2005 | Moriya et al. | 704/229 |
| 2005/0134450 A1 | 6/2005 | Kovach | |
| 2005/0134454 A1 | 6/2005 | Eskildsen | |
| 2005/0136882 A1 * | 6/2005 | Boulton | 455/343.4 |
| 2005/0198359 A1 * | 9/2005 | Basani et al. | 709/232 |
| 2005/0249181 A1 * | 11/2005 | Vijayan et al. | 370/344 |
| 2005/0254475 A1 * | 11/2005 | Kubler et al. | 370/338 |
| 2005/0275530 A1 * | 12/2005 | Kates | 340/539.22 |
| 2006/0013168 A1 * | 1/2006 | Agrawal et al. | 370/335 |
| 2006/0045053 A1 * | 3/2006 | Erlich et al. | 370/338 |
| 2006/0198426 A1 * | 9/2006 | Partyka | 375/133 |
| 2006/0238413 A1 * | 10/2006 | Yehudaie | 342/174 |
| 2007/0064669 A1 * | 3/2007 | Classon et al. | 370/347 |

FOREIGN PATENT DOCUMENTS

| | | |
|---|---|---|
| EP | 676 733 A | 10/1995 |
| EP | 811 959 A | 12/1997 |
| EP | 0 856 826 A2 | 8/1998 |
| EP | 1 115 264 A2 | 7/2001 |
| EP | 1 363 260 A1 | 11/2003 |
| EP | 1 499 098 A1 | 1/2005 |
| EP | 1 316 933 B1 | 8/2006 |
| GB | 2 325 548 A | 11/1998 |
| GB | 2 358 504 A | 7/2001 |
| JP | 01236397 A | 9/1989 |
| JP | 11154292 | 6/1999 |
| JP | 2003233889 | 8/2003 |
| JP | 2005071064 | 3/2005 |
| WO | WO 88/07474 | 1/1988 |
| WO | WO 00/03367 | 1/2000 |
| WO | WO 01/27763 A1 | 4/2001 |
| WO | WO 02/46919 A2 | 6/2002 |
| WO | WO 2004/064355 A2 | 7/2004 |
| WO | WO 2004/079684 A1 | 9/2004 |
| WO | WO 2004/114648 A2 | 12/2004 |
| WO | WO 2005/065196 A2 | 7/2005 |

OTHER PUBLICATIONS

Shrenharsha Rao, SWRA041: Implementing a Bidirectional Wireless UART Application With TRF6903 and MSP430, Sep. 2004, Texas Instruments.*

* cited by examiner

Short Message Frames

Preamble Frame

| Learn | Learn | Learn | Synch | Type | Last | Counter | Syst_id_lo | Syst_id_hi |
|---|---|---|---|---|---|---|---|---|
| 01010101 | 01010101 | 010 | 11111 | 01 | x | ccccc | | |
| 1 byte | 1 byte | 1 byte | | | 1 byte | 1 byte | 1 byte |

Data Frame

| Learn | Synch | Type | Counter | Data1 | Data2 | Data3 | CRC |
|---|---|---|---|---|---|---|---|
| 010 | 11111 | 01 | cccccc | | | | |
| 1 byte | | | 1 byte | 1 byte | 1 byte | 1 byte | 1 byte |

FIG. 5

Long Message Frame

| Learn | Synch | Type | RFA | Counter | Data1 | Data2 | Data3 | Data4 | Data5 | Data6 | CRC |
|---|---|---|---|---|---|---|---|---|---|---|---|
| 010 | 11111 | 01 | x | ccccc | | | | | | | |
| 1 byte | | | | | 1 byte | 1 byte | 1 byte | 1 byte | 1 byte | 1 byte | 1 byte |

Long Packet Format

| Preamble | Header | Data | MAC |
|---|---|---|---|
| 1 Frame | 1 Frame | 22 Frames | 1 Frame |

Large File Transfer

SPREAD SPECTRUM WIRELESS COMMUNICATION AND MONITORING ARRANGEMENT AND METHOD

RELATED PATENT DOCUMENTS

This patent document claims benefit under 35 U.S.C. §119 (e) to U.S. Provisional Patent Application No. 60/719,369, entitled "Security Monitoring Arrangement and Method with Privacy Control," filed on Sep. 22, 2005.

FIELD OF THE INVENTION

The present invention is directed to a spread spectrum wireless communication and monitoring arrangement and method that monitors using wireless communication between two devices and, more specifically, to a monitoring arrangement and method that monitors activity using a remote device to report to a central device.

BACKGROUND

A variety of monitoring systems are implemented using different monitoring devices, such as cameras, motion sensors, keypads or contact sensors. For example, many buildings have multiple locations that are monitored for security purposes, requiring multiple monitoring devices in the different locations. For increased security and functionality, the monitoring devices can be configured to communicate with one or more central devices. The central device can, among other things, perform monitoring or recording functions, determine whether the security has been breached and whether to contact security personnel.

One method of communicating between the monitoring devices and the central device is by a physical connection, such as electrical or other wiring. Using wiring to establish communication between the security devices can be troublesome for a number of reasons, such as the high cost of installation and maintenance. For example, exposed wiring is often unacceptable in a building, and thus, the installation of the monitoring system requires passing the wires through the walls of the building. This type of installation can significantly increase the time required to complete a monitoring system installation. Moreover, the use of wires can limit the functionality of many monitoring systems, such as where it is desirable to have portable monitoring devices.

One potential solution is to use wireless monitoring devices to reduce or eliminate the need for physical connections between the devices, however, wireless monitoring systems also have a set of problems, such as battery life. Ideally, the security devices would be self-powered by, for example, a battery. Self-powered devices are more secure because they are not subject to failure upon a loss of power to the building. They also require less installation problems because they do not need to be connected to a separate power source; however, self-powered devices often have reliability issues due to the finite life of their power source. Increasing the useable time of a power source reduces the cost for replacement of the power source and increases the usefulness of the entire system by having less potential downtime of the system or its components. Several recent developments have increased the potential power requirements of wireless monitoring devices.

Another problem with power requirements arises from the desire to have increased monitoring capabilities with smaller devices. As monitoring systems become more advanced, the power requirements of the monitoring devices are often increased. For instance, monitoring devices that contain digital cameras require enough power to run the camera, to store the digital picture in memory and to transmit the digital picture to the central device. The increased functionality of the monitoring devices, along with the desire to have smaller, less noticeable devices with less room for batteries or other power sources, has impacted the reliability of the monitoring devices.

Attempts have been made to implement wireless security systems using a variety of methods. One such method is taught by European Patent Application Publication No. EP 1 363 260 filed on May 6, 2003, entitled "Procédé de communication radiofréquence entre plusieurs dispositifs et système de surveillance mettant en œuvre un tel procédé," which is fully incorporated herein by reference. Yet, these methods still leave room for improvement.

These and other issues have presented challenges to the implementation of wireless communication devices, including those involving monitoring systems and similar applications.

SUMMARY

The present invention is directed to the above and related types of integrated security systems. These and other aspects of the present invention are exemplified in a number of illustrated implementations and applications, some of which are shown in the figures and characterized in the claims section that follows.

In one embodiment of the present invention, a monitoring system is implemented for wireless communication between a central device and monitoring devices. Each of the devices includes a wireless communication circuit to effect wireless communications between the central device and the monitoring devices. Communication intervals that define communication between at least one of the monitoring devices and the central device are provided along with a selected frequency for communicating between the devices. Communication is established between the devices based on the communication intervals and the selected frequency, and power consumption is reduced in at least one of the devices as a function of the communication intervals and the selected frequency. Moreover, at least one of the devices relies on a limited power source, and the central device collects monitoring data from the monitoring devices while mitigating power consumption from the limited power source.

In another example embodiment of the present invention, a method is implemented for wireless communication between a central device and monitoring devices. Each of the devices includes a wireless communication circuit to effect wireless communications between the central device and the monitoring devices. Communication intervals that define communication between at least one of the monitoring devices and the central device are provided along with a selected frequency for communicating between the devices. Communication is established between the monitoring device and the central device using the communications interval and the selected frequency. The power consumption of at least one of the wireless communication circuits is reduced as a function of the communications interval and the selected frequency. Moreover, at least one of the devices relies on a limited power source, and the central device collects monitoring data from the monitoring devices while mitigating power consumption from the limited power source.

In another example embodiment, a communications protocol is implemented using a receiver which reduces power by limiting its active listening time. The receiver limits the active listening time by coordinating a transmission period and a listening frequency in accordance with the communications protocol.

In another example embodiment, a communications protocol is implemented using a transmitter which reduces power by limiting its active transmission time while maintaining equal channel use. The transmitter limits the active transmission time by coordinating a transmission period and a listening frequency in accordance with the communications protocol.

In another example embodiment, a communications protocol is implemented using a transceiver which reduces power by limiting its active listening time or its active transmission time by coordinating a transmission period and a listening frequency in accordance with the communications protocol.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIG. 5 shows the format of the transmission of short messages, according to another example embodiment of the present invention;

Figure 1:
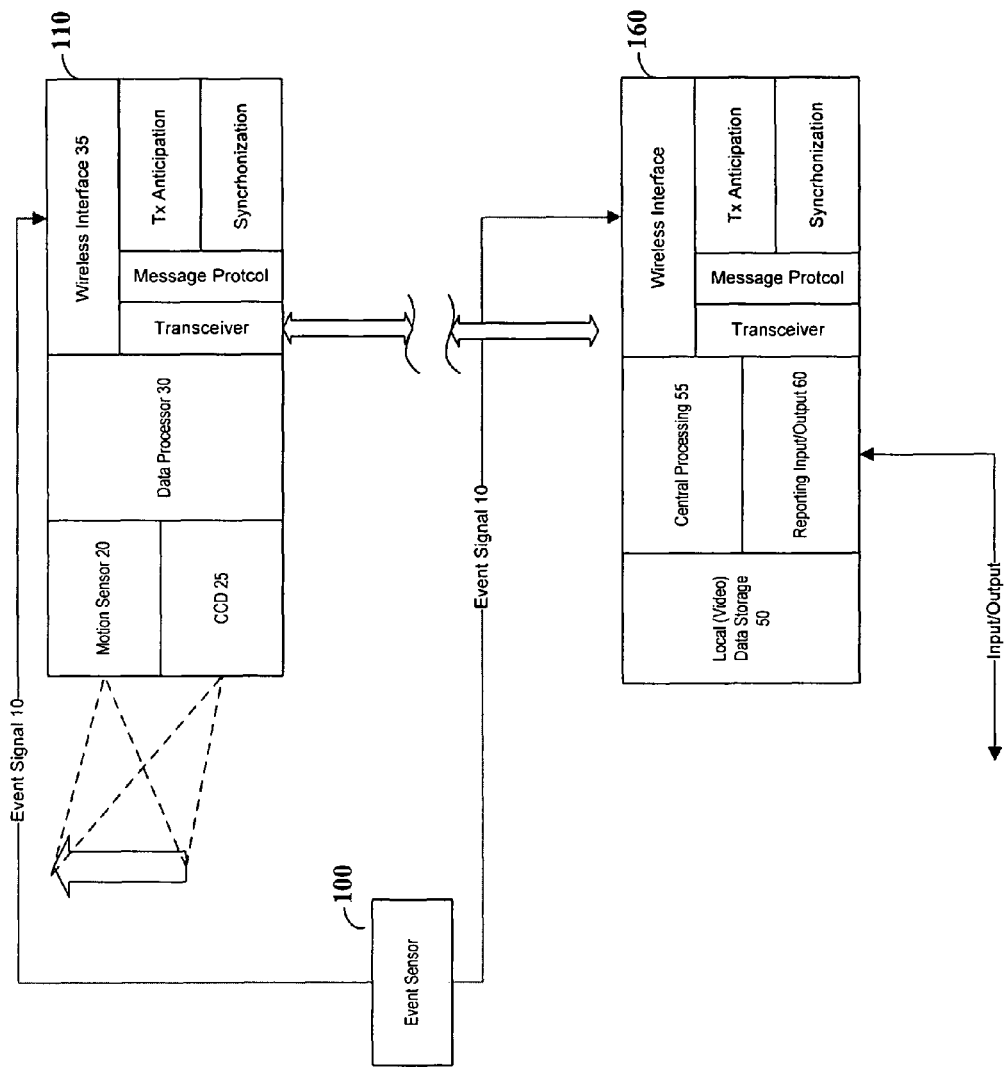
FIG. 1 illustrates a monitoring system, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different approaches and arrangements for providing monitoring services. The invention has been found to be particularly advantageous for addressing monitoring needs using wireless monitoring devices while reducing the power consumption of the monitoring devices.

The monitoring devices include image capture devices, motion detection devices and other monitoring methods. For instance, a motion sensor configured with an image capture device can be implemented to report movement and image information for various uses. A few examples of such uses include, reporting objects hidden from an operator of large machinery or vehicle, reporting pets that enter or leave proscribed areas, reporting security breaches, remote-environment monitoring, reporting criminal activity and reporting unusual driver behavior.

According to an example embodiment, a monitoring system provides monitoring and reporting functions using spread spectrum wireless communications between one or more monitoring devices and a central device for receiving the reporting information from the monitoring devices. The monitoring device activates a motion detection circuit in response to a predefined event occurrence. The camera arrangement of the monitoring device activates in response to the motion detection circuit sensing or failing to sense movement. Each of the devices includes a wireless communication circuit to effect wireless communications between the central device and the monitoring devices, and at least one of the devices relies on a limited power source. Power consumption is reduced for at least one of the wireless communication circuits by coordinating a communications time interval and a selected channel for communication between the central device and the monitoring device to effect wireless communications between the central device and said at least one of the monitoring devices. The selected channel is one of a sequence of channels used for wireless communications between the central device and the monitoring devices. The central device collects reporting data from the monitoring devices while mitigating power consumption from the limited power source.

FIG. 1 depicts several elements of monitoring device 110 that may be implemented, including a transceiver block, a message protocol block, a synchronization block and a transmit (Tx) anticipation block. Various embodiments of the present invention use one or more of these blocks. In one such embodiment, a monitoring device wirelessly transmits a signal using the transceiver block. The monitoring device uses information regarding a transmission period and the listening channel of the central device during the transmission process.

The monitoring devices transmit monitoring information to the central device. For instance, monitoring device 110 might transmit video images or device-status information to the central device.

FIG. 1 depicts central device 160 as including a transceiver block, a message protocol block, a synchronization block and a transmit (Tx) anticipation block. Various embodiments of the present invention use one or more of these blocks. In one such embodiment, the transceiver block is used for receiving signals from one of the monitoring devices as a function of the communication intervals and the frequency the central device uses to listen for transmissions. The listening frequency is one of several potential frequencies available for communication between the monitoring devices and the central device. For instance, the system may use a number of contiguous frequency slots (channels) within a suitable frequency band. One example of such a use includes 25 or more channels within the ISM frequency band from 902-928 MHz. Numerous other combinations of channels and frequency bands are possible using the present invention.

Typically, the central device and monitoring devices are implemented using a similar set of elements as depicted by blocks 110 and 160; however, various components may be implemented differently. For instance, the synchronization block can be implemented differently in the central device versus the monitoring devices where the central device provides synchronization information to each of the monitoring devices and the monitoring devices must use the synchronization information to maintain synchronization using a local clock. In such an instance, the monitoring devices would compare the synchronization information with the local clock in order to compensate for any difference between the monitoring devices' time frames and the central device's time frame. The synchronization information can take the form of a time index, such as a counter value, a current time of day or any other time based data which the monitoring device can use as a reference for synchronization. In another example, the time index can be a reference within each message transmitted. Using such a system, the peripheral device can compare when the message was received to when the message was expected. The peripheral device may also be configured to adjust the local clock using a compensation for a timing error. For instance, if the peripheral clock appears to be running slower than the control panel, the peripheral can compensate by increasing the clock frequency or using a counter to compensate for the differences between clocks.

The central device and the monitoring device blocks are depicted as having a transceiver; however, the system may be implemented using variations of receivers and transmitters. In some instances, a monitoring device may be implemented with only a transmitter. In other instances, a monitoring device may be implemented with only a receiver. Other implementations allow for one or more of the central devices and monitoring devices to have both a transmitter and receiver (transceiver). Thus, transceiver is used herein to describe a receiver, transmitter or both a receiver and transmitter.

One embodiment of the present invention reduces the power of one of the devices as a function of the listening channel and a communications period. The system decreases the length of time that a receiver is active by using the communications period and listening channel to reduce the window of time necessary to receive the start of a transmission. When the receiver is not active, various methods of power reduction are employed, such as removing power from the receiving devices or reducing or stopping selected functions (e.g., amplification or processing).

Another embodiment synchronizes the various monitoring devices with the central device. The synchronization can further reduce the active time of the transmitter because, for example, the transmitter may limit the transmission times relative to the times for which the receiver is active. Such a reduction can be accomplished because, for example, in many systems the transmission time cannot be shorter than the Rx activation period of the receiver without knowledge of when the Rx activation occurs; however, synchronization can reduce the transmission times to less than the Rx activation period of the receiver.

In a specific example, the central device sends periodic synchronization messages to the monitoring devices. A monitoring device that determines it has lost synchronization with the central device can increase the active time of the receiver to compensate for the loss in synchronization. In the event that the monitoring device is no longer receiving synchronization messages, the device can increase the active receive time to ensure that a transmission from the central device will be received. The monitoring device can increase the activation time based upon an expected accuracy of the local tracking (e.g., local clock) of the central device time-base. For instance, where the expected accuracy of the local tracking is relatively high, the monitoring device increases the activation time only upon the loss of several synchronization messages.

Some devices, such as a keyfob or other handheld device, are portable and are often removed from the wireless communication range of the rest of the system or may cease to receive or transmit information in response to a period of inactivity. Thus, the portable devices often lose synchronization during the time they are unable to communicate with the central device. Accordingly, such portable devices frequently increase the activation time to compensate for the lack of synchronization between the portable devices and the central device. The frequent increase in activation time often leads to a high rate of power consumption. To compensate, portable devices can be implemented to shut down transmission monitoring efforts until an external action occurs, such as a button being pressed.

In one embodiment of the present invention, the messages sent by the central device are received by multiple monitoring devices simultaneously. Where the message is not intended for all the monitoring devices, the message can include information that indicates for which monitoring device the message is intended. The message can also indicate a channel that the monitoring device uses to acknowledge the receipt of the message.

According to an example embodiment, a monitoring system utilizes cameras to detect and to identify relevant situations, while reducing power consumption of the one or more devices in the system. The system includes an integrated camera/motion detector that is responsive to predetermined situations and conditions and mitigates the power consumption on various levels, including the power consumption necessary for wireless communications and for activating the camera and motion detector. A system user sets up zones with at least one event detector (e.g., proximity/noise detectors or door/window contacts) and sets up corresponding camera/motion detectors. The event detectors are activated (armed) by a system user, using, e.g., a keypad on a security panel, a remote control fob, or a phone call with DTMF. The camera remains "off" unless appropriately triggered by the motion detector. However, the motion detector also remains "off" unless it is armed by a corresponding event detector. Therefore, cameras record after both an event detector has been tripped and a motion detector has detected motion.

FIG. 1 includes optional event sensor 100, central device 160, and monitoring device 110. The monitoring system is implemented in such a manner so as to reduce the power consumption of the central device and monitoring device as related to the wireless communications between the devices and the sensing functions of the monitoring device. When implementing the wireless communications, the devices use multiple frequencies (channels) as well as communication intervals. The devices are able to reduce the power consumption by utilizing information regarding a specific frequency from the multiple frequencies used and the communication interval. For example, if the transmitting devices modify their transmissions based upon the information, a receiving device may reduce the power consumption by decreasing the time the receiving device is listening for a transmission from another device. By reducing the power consumption, the system lends itself to implementing bi-directional communications between the devices, which typically require more power consumption than unidirectional communications.

In one embodiment, the monitor device 110 integrates a motion sensor 20, a camera 25, a data processor 30, and a communication interface 15. Depending on the application of the system, multiple monitoring devices are implemented in different locations, with a central device 160 acting as a conventional communication hub for the system. When the monitor device 110 receives an event signal 10 from the event sensor 100 the motion sensor 20 is activated. As shown in FIG. 1, the intrusion sensor input 10 can interface with the monitor device 110 using the wireless communications interface 35. This sensor input 10 can inform either the monitor device 110 directly or inform the central device 160 which in turn informs the monitoring device. Upon receiving sensor input 10 the monitor device 110 arms the motion sensor 20. Once armed, the motion sensor 20 can detect motion in its field of view and the camera 25 can become activated. The motion sensor 20 and the camera 25 are typically positioned such that both devices have overlapping fields of detection. Thus, images of the source of the detected motion are recorded by the camera without requiring any intervening adjustment or alignment. The recorded images are processed by a data processor 30, which can be integrated with the motion sensor 20 and the camera 25 in a monitor device 110 as shown, or may be located remotely and electrically coupled to the monitor device 110.

It will be appreciated that the data processor 30 can be implemented, for example, in the form of a high-speed processor such as a DSP (including an ALU) and/or a more general-purpose processor that may be optionally programmed for video data (de)compression. Thus, various embodiments may include a variety of combinations of processing operations with one or more aspects of the processing operations performed at one or more local or remote processors. For example, both video data storage and compression may be performed in the monitoring device 110 by the data processor 30. When the processor is located remotely, the data storage may still occur in monitoring device 110, but compression of the video data could be implemented in the remote processor. Another embodiment may involve data storage in the monitoring device 110 without any compression of the video data. Moreover, each of the above operations may be performed in combination with a central processor 55, as further discussed below.

In example implementations, the monitor device 110 is implemented for home security applications where privacy is sometimes an issue. For further information on such a device, reference may be made to copending provisional application Ser. No. 60/785,570 filed on Mar. 24, 2006, entitled "Motion-Image Monitoring Method and Device" and copending application Ser. No. 60/719,369 filed on Mar. 24, 2006, entitled "Security Monitoring Arrangement and Method with Privacy Control". In certain implementations, the system can be configured for building-security applications.

The recorded images are transmitted using the wireless communication protocol discussed herein to a central device 160. The transmitted images may be encrypted by the data processor 30 before being transmitted to the central device 160. The central device 160 includes a local storage area for the recorded images 50, the central processing unit 55, and an output 60. The central device 160 is located within wireless broadcast range of the monitoring device 110. The central processor 55 receives images from each of the monitoring devices located within the wireless broadcast range. Similar to the above discussion, the central processor 55 may perform a variety of processing operations alone or in combination with data processor 30. The images may optionally be stored in data storage 50 for further review or processing. The central device 160 includes a battery backup power source 65 in the event of a loss of power, e.g., a natural disaster or an intruder disables power to the facility. The output 60 further transmits signals including system status reports or recorded images to monitoring facilities. Example outputs include a local display to show the recorded images and remote monitoring facilities using, for example, a telephone (landline or cellular) connection or an internet connection. The remote monitoring facilities may include a private security company, a local law enforcement station or an operator of the system.

In another example embodiment, when an event sensor senses the occurrence of a predefined event, the event signal (via sensor 10) is transmitted directly to the central device 160. The predefined events vary depending upon the application, but can include noise detection, intrusion detection, machinery activation or depression of a pressure sensor. The central device 160 arms one or more monitoring devices 110 in the same zone as where the intrusion signal 10 originated. The monitoring device(s) 110 respond as discussed above. In this system architecture, the central device 160 is the master and the sensors and central devices (e.g., keypads, keyfobs) are slave devices. The radio link in this architecture is a star topology with the central device 160 at the center of the network. The branches include monitoring devices 110 and external links, e.g., a telephone, broadband connection, or wired connections.

The communication between the central device 160 and monitoring devices 110 represent wireless communications between the central device and the monitoring devices. The wireless communications may be implemented using suitable frequencies. For instance, wireless communications frequencies in industrial, scientific and medical (ISM) radio bands (900 Mhz, 2.4 Ghz and 5.8 Ghz) have been found to be suitable for monitoring systems; however, alternate frequencies may be implemented in accordance with the particulars of the system or its intended implementation.

The various elements of the monitoring devices and the central device are implemented using one or more of electric circuit arrangements, processors, memory elements, software code, programmable logic devices, input/output interfaces or combinations thereof.

Figure 1A:
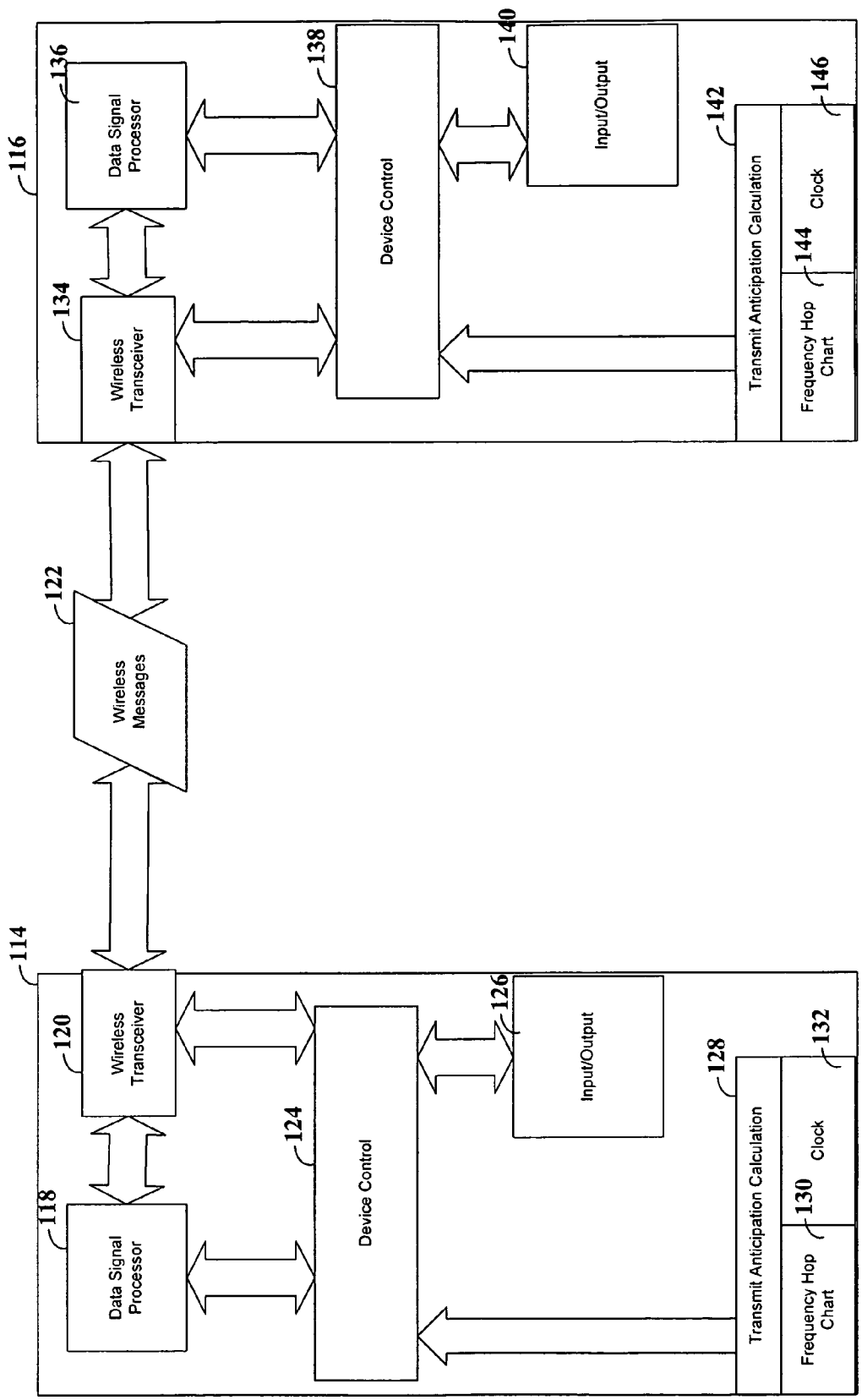
FIG. 1A shows a block diagram of two wireless communication devices, according to another example embodiment of the present invention.

FIG. 1A depicts an example embodiment of two wireless communication devices used in the monitoring system of FIG. 1. FIG. 1A includes several components contained with wireless devices 110 and 160. These wireless devices correspond to example embodiments of the monitoring device and central devices of FIG. 1.

Wireless transceivers 120 and 134 transmit information from one device to the other via wireless communications. Wireless messages 122 represent the information communicated between the wireless devices and typically carry various forms of data used in maintaining the monitoring system. For example, wireless device 114 may receive data from Input/Output (I/O) 126 and transmit the data to wireless device 116. Prior to transmission and upon receipt of the data, the information is processed by data signal processors 118 and 136.

Device control blocks 124 and 138 reduce the power of wireless devices by controlling the function of the transceivers. To this end, a control block receives a transmit anticipation indication as depicted in blocks 128 and 142. This transmit anticipation calculation is based upon the clock circuit (132 or 146) and the frequency-hop chart (130 or 144).

The clock circuit may be used to determine the expected active time of the receiving transceiver. In one embodiment, the wireless devices send messages providing synchronization information. The wireless devices use the synchronization information to synchronize the transmission and receive periods of the devices. The synchronization may be implemented using various methods, some of which may include transmitting the current time of day as determined by one of the devices between the devices, transmitting time information relating to the current transmission period as determined at one of the devices, transmitting a value subject to change with respect to time (e.g., a counter) or receiving synchronization information from an external source other than the wireless devices.

Input/Output blocks 140 and 126 represent optional interfaces for sending and receiving data other than through wireless communications. For instance, the devices may have a local display, a local alarm, wired interfaces, Ethernet, telephone or other communication outputs.

The frequency-hop chart represents the possible channels used for wireless communication as well as the order with which the channels are used. In one embodiment, the frequency-hop chart is represented by values stored in a memory or similar circuit. In another embodiment, the frequency-hop chart may be an algorithm that is used to determine the current or future channel based upon known factors. For instance, the algorithm may provide the channel based upon the current time.

In response to the transmission anticipation time, the control activates the transceiver to begin transmitting. This process allows for one or more of the wireless communications devices to reduce their power consumption. For instance, the synchronization and transmit anticipation times allow the control blocks to decrease the time the transceivers are in an active state and place the transceivers (and possibly other related functions) in a state where the power consumption of the devices is less than the power consumption of the active state.

Figure 2:
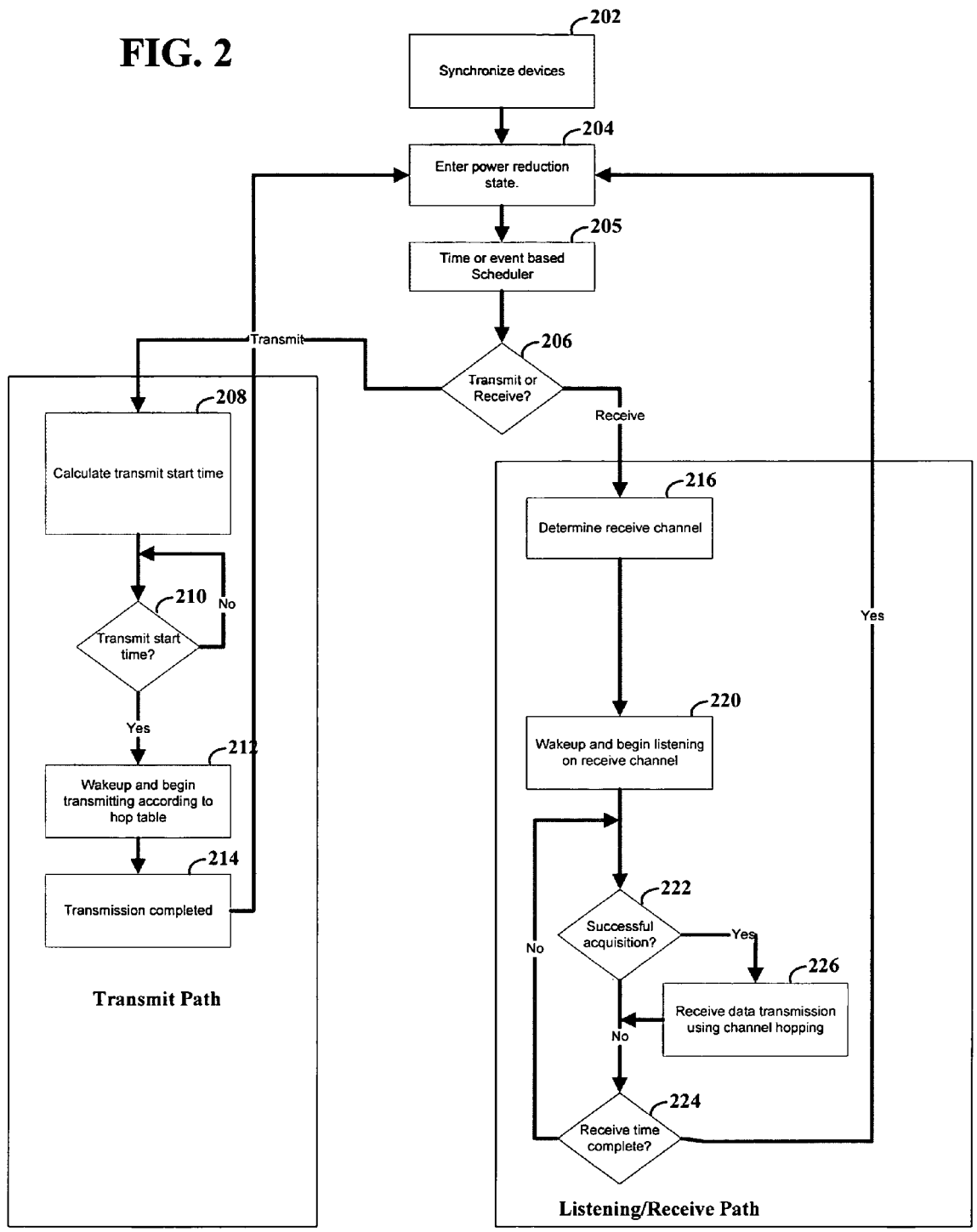
FIG. 2 shows a flow chart for a method of communication between communication devices in a monitoring system, according to another example embodiment of the present invention.

FIG. 2 depicts an example method according to another embodiment of the present invention. The method of FIG. 2 may be implemented using two or more wireless devices. The devices synchronize with respect to each other or an independent time source as depicted at block 202. This synchronization step is shown as the first step in the process; however, the devices may synchronize after one or more transmissions, or they may synchronize periodically.

When the devices are not actively transmitting, receiving or listening, they are typically in a power reduction state as depicted by block 204. A scheduler determines that the device will begin transmitting or listening/receiving based upon time-based or event-based criteria as shown by block 205. In response to determining that the device will begin transmitting or listening/receiving, the device begins either the transmit path or receiving path as depicted by the decision block 206. The device typically makes the determination based upon the configuration of the monitoring system and the communication protocols. For example, a monitoring device may determine that it will begin transmitting upon receiving information from a sensor or other input, such as a window sensor being triggered. The central device or monitoring device may periodically determine that it will begin listening for any information transmitted from the other devices. Alternatively, a device may determine that it will begin listening/receiving for a response to a previous communication. Other examples of factors used in the determination include the need for synchronization messages, configuration of monitoring devices and requests for repeating corrupted data.

A transmitting device follows the transmit path to effect a transmission to another device. Prior to transmitting, the transmitting device calculates the transmit start time as shown at block 208. In one embodiment, the transmit start time is a function of the expected listening channel of the receiving device and the transmission period. In a more specific embodiment, the transmit start time may be calculated based upon the number of channels in a frequency sequence (frequency-hop table) between the current transmitting channel and the expected listening channel of the receiving device and the expected listening time the receiving device will begin listening on the expected listening channel (receive activation time).

As shown at block 210, the transmitting device determines whether the transmit start time has been met. The transmitting device bases the determination by, for example, a comparison of the transmit start time and the current time. Until the transmit time has been met, the transmitting device remains in the power reduction state. Once the transmit time has been met, the transmitting device enters a transmitting state and begins wireless transmissions as depicted in block 212. The transmitting device determines the transmission frequency using the frequency-hop table.

Typically, the receiving device recognizes the wireless transmission, and upon a successful acquisition phase, begins to track the transmitting device. The transmitting device then proceeds to transmit the desired message/data to the receiving device. Upon completion of the transmission as depicted in block 214, the transmitting device returns to the power reduction state as shown in block 204 and the process is repeated.

Similarly, a receiving device follows the listen/receive path to receive a transmission from another device. The receiving device first determines what channel to begin listening for a transmission as shown in block 216. This determination may be a known value stored in a local memory or an output provided from a circuit. Alternatively, the determination may be based upon other variable factors, such as a previous transmission time or data received from an input of the receiving device.

Typically, the receiving device will stay in the power reduction mode until the activation time. At or near the activation time, the receiving device leaves the power reduction mode to enable the device for the receipt of a transmission as depicted in block 220. The receiving device then continues to listen for a transmission until one of two conditions is met. The first condition is depicted by block 222 and represents the successful receipt and acquisition of a transmission from another device. The second condition is depicted by block 224 and represents a specified time frame during which the receiver is to remain active. If the receiving device determines that the second condition has been met, the receiving device returns to the power reduction state shown in block 204; however, if the receiving device determines that the first condition has been met, the transmission is received from the transmitting device as shown in block 226. Upon completion of the transmission, the receiving device resumes listening, unless the specified time frame of block 224 has been completed. If the time frame has been completed, the device returns to the power reduction state shown in block 226.

In one embodiment, one or more of the devices may only be capable of transmitting, and one or more of the devices may only be capable of receiving. Such devices would follow only the transmission or receiving path, respectively. In other embodiments the devices are capable of both transmitting and receiving and would follow the appropriate path.

Figure 3:
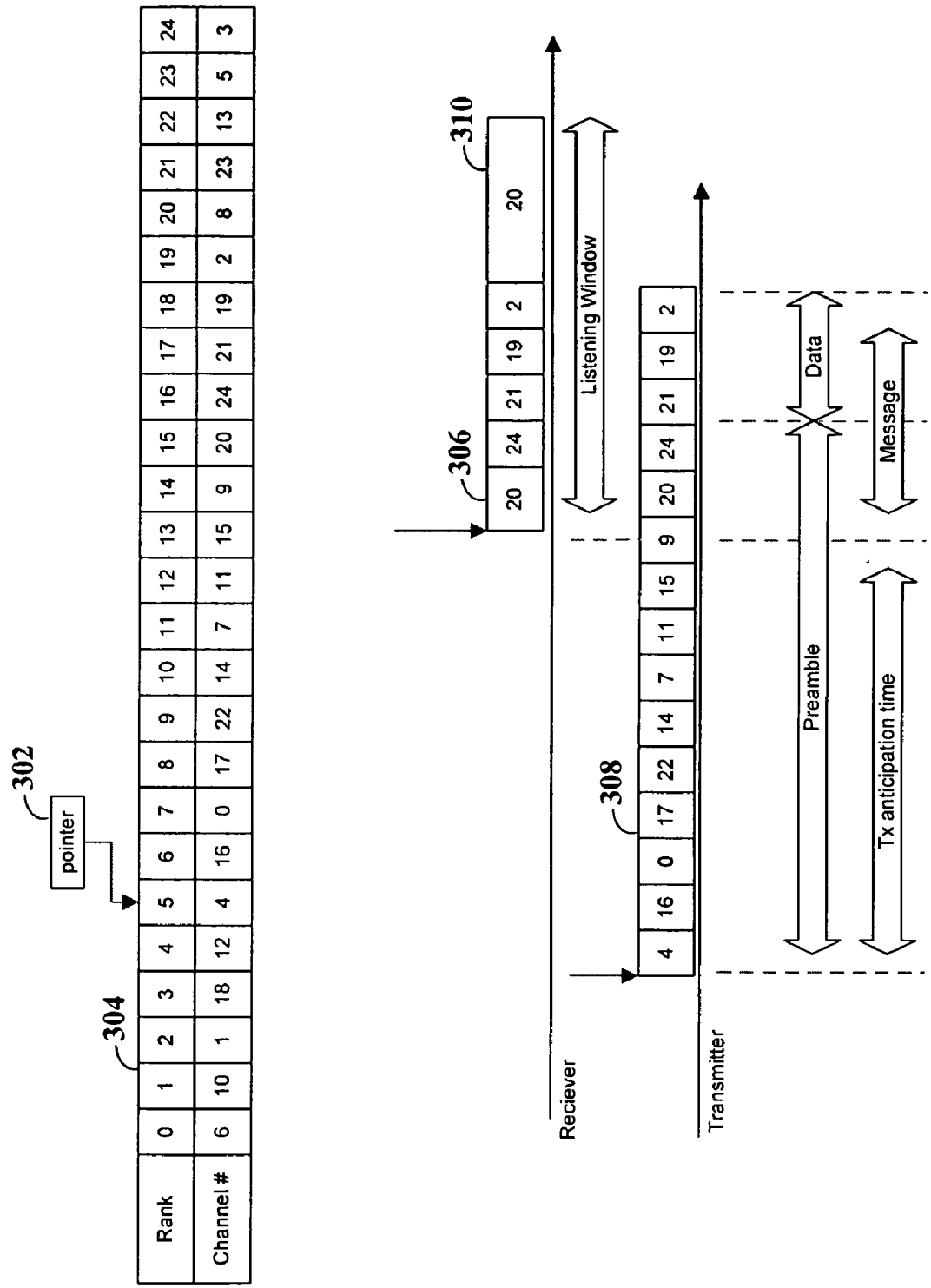
FIG. 3 shows an implementation of a transmit anticipation time and frequency-hop table, according to another example embodiment of the present invention.

FIG. 3 shows an implementation of the transmit anticipation time and frequency-hop table, according to another example embodiment of the present invention. The figure depicts frequency-hop table 304, its pointer 302 and the receiver and transmitter timelines.

Frequency-hop table 304 represents an order of frequency channels used by both the receiver and the transmitter to communicate. To increase security, decrease data loss and conform to (FCC) regulations, the order of the channels is typically pseudo-random. For instance, table 304 shows ranks 0-24 in the top row of the table. These ranks reflect the order of the channels used by the devices and correspond to the channel in the lower row of the table. The communicating devices would use the channels in the order provided. Thus, table 304 may be used in applications using frequency-hopping spread spectrum or similar techniques.

Pointer 302 represents the current channel to be used by the transmitting device. More specifically, a transmitting device begins transmitting according to the channel indicated by the pointer. In one embodiment, this channel represents the last channel used by the transmitting device or the channel immediately following the last channel used. This use of the pointer by a transmitting device ensures that the channels are utilized equally because the transmitting devices transmit according to the frequency-hop table.

The receiver and transmitter timelines depict the channels used by a receiver and transmitter as a function of time. In this example, time increases from left to right. The receiver begins listening at the start of the Rx activation as shown by the arrow and block 306. This represents the time at which the receiver is listening for a transmission from the transmitter. In this instance, the receiver is listening to channel 20, which corresponds to rank 15 of table 304.

The transmitter timeline depicts the transmitter beginning to transmit at the start of the Tx anticipation time as shown by the arrow at the start of the Tx anticipation time and block 308. The transmitter begins transmitting on the channel that corresponds to the pointer 302. In this instance, the pointer indicates rank 5 and channel 4. The transmitter changes frequency according to the wireless communications protocol being implemented and the table 304 as shown by block 308. The Tx anticipation time is the time the transmitter begins transmitting in relation to the Rx activation time. The Tx anticipation time is selected so that, during the Rx activation time, the transmitter is transmitting on the same channel to which the receiver is listening. If a frequency-hopping spread spectrum is used, the Tx anticipation time is a function of the current rank determined by pointer 302 and the Rx activation channel of the receiver. More specifically, the anticipation time is calculated using the number of the channels in table 304 between the current rank and the Rx activation channel. This number is multiplied by the time the transmitter is active on any one channel (dwell time) plus the time required to switch to a new channel (blank time).

During the Tx anticipation time, the transmitter sends preamble frames as shown by the transmitter timeline from channel 4 to channel 9. After the transmitter reaches the transmit anticipation time, it transmits a preamble frame using the listening channel followed by the remainder of the message. The receiving device acquires the transmitter using the preamble frame and tracks the transmitter according to the frequency hop table, as shown on the receiver timeline. In an alternate embodiment, the transmitter transmits one or more preamble frames after transmitting the preamble frame using the listening channel. For example, FIG. 3 depicts preamble frames transmitted on the listening channel (20) and a subsequent channel (24). Using this method, the number of preamble frames can be increased so as to improve quality of the acquisition phase between the transmitter and the receiver.

The receiver continues listening on the channel until the listening window is over as shown by block 310. In some instances, the listening window may only be long enough to receive a single message resulting in a short active time of the receiver and a reduction in power consumption. For such instances, the listening shown by block 310 is not implemented. In other instances, the listening window may be longer to accommodate several messages, or devices which are not synchronized. For example, the central device often requires a longer listening window because devices such as keyfobs lose synchronization.

In an alternate embodiment, the pointer can represent the last channel used by the receiving device or the channel immediately following the last channel used by the receiving device. For example, the central device can implement a pointer for each monitoring device. When the central device wishes to communicate with a receiving monitoring device, the central device begins transmitting on the channel indicated by the pointer that corresponds to the receiving monitoring device. After a completed transmission, the central device and the monitoring devices will use the next channel in the frequency-hop table. This use of pointers also ensures equal utilization of channels because the transmitter transmits according to the frequency-hop table for each monitoring device. This embodiment is particularly useful for situations where the transmitting device is the only device that transmits to the receiving device as can sometimes be the case in a system where a central device transmits to monitoring devices. Accordingly, an alternate scheme can be used for a monitoring device transmitting to a central device.

Consistent with this embodiment, the transmitting device does not calculate a transmission anticipation time. Instead, the transmitting device begins transmitting on the channel indicated by the pointer at the Rx activation time because the first transmitting channel is the same as the receiving channel. Other methods can be used to determine the starting transmission channel. For example, the receiving channel can be periodically changed for each receiving device and the pointers at the transmitting device are changed accordingly. In some instances, transmissions using channels that have not been used equally can be added to balance the use of the channels, or the central device can periodically send information to control the use of listening channels by the monitoring devices.

Figure 4:
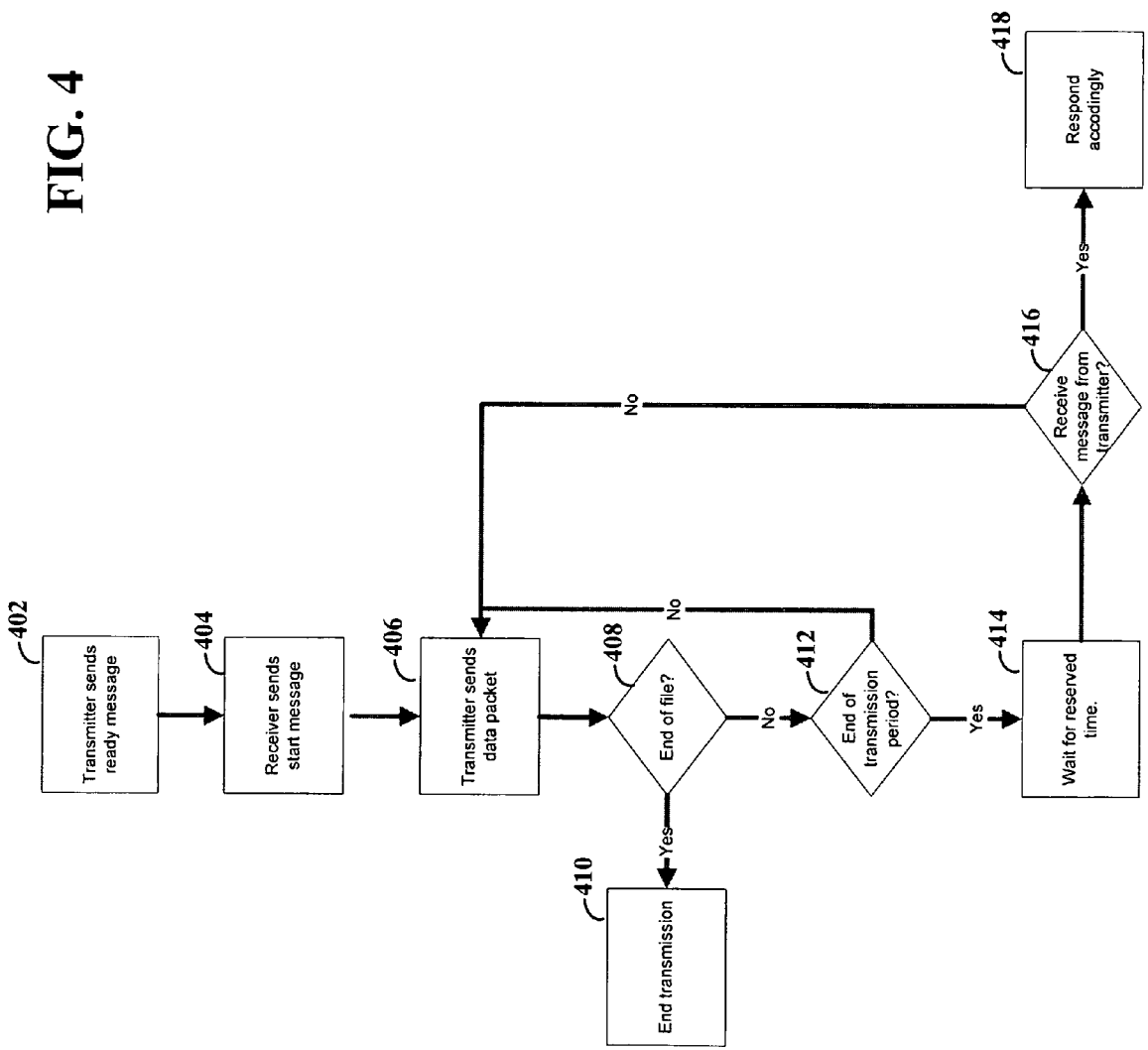
FIG. 4 is a flow chart for a method of transmitting data, in accordance with another example embodiment of the present invention.

FIG. 4 depicts a flow chart for a method of transmitting data in accordance with another example embodiment of the present invention. The method is particularly useful for controlling the transfer of data files large enough to require the use of many data packets. The method can be implemented to increase the throughput of the wireless communications link while allowing other communications during the transfer of a large data file. The increased throughput and other factors can also reduce the power consumption necessary for the transmission of the large data file.

In a typical embodiment, the monitoring device has one or more data files to transmit to the central device. This situation should not be considered exclusive, as for example, the central device or another monitoring device may have one or more data files to transmit to a monitoring device. The transmitting device sends an indication that a large data file is ready to be sent to the receiving device as depicted in block 402. When the receiving device is ready, the receiving device sends a start message to the transmitting device as shown in block 404.

The transmitting device sends consecutive packets (block 406) until one of two conditions (blocks 408 and 412) is met. The first condition is met after the entire file has been transmitted, and the transmission has been completed as shown in block 410. The second condition is met when the current transmission period has ended. Several embodiments of the present invention implement variations of the transmission period. For instance, it may be advantageous to limit the transmission period of a monitoring device to the central device so that other monitoring devices may communicate to the central device. Alternatively, the transmission period may be limited to allow the transmitting or receiving device to perform processing of the data or other functions. In one such embodiment, the transmission period for large data transfers is limited to 812.5 ms out of 1 second intervals.

When the second condition is met, the transmitting device stops transmitting the file during the time reserved for other functions as depicted in block 414. In one embodiment, the receiving device can send a message to the transmitting device during this reserved period as shown in block 416. Upon receipt of such a message, the transmitting device can take appropriate action (block 418). For instance, the receiving block may alert the transmitting device of lost packets so that the transmitting device can send the lost packets a second time. If, however, the transmitting device does not receive a message from the receiving device, and the reserved time has passed, the transmitting device resumes sending packets as shown in block 406.

Figure 6:
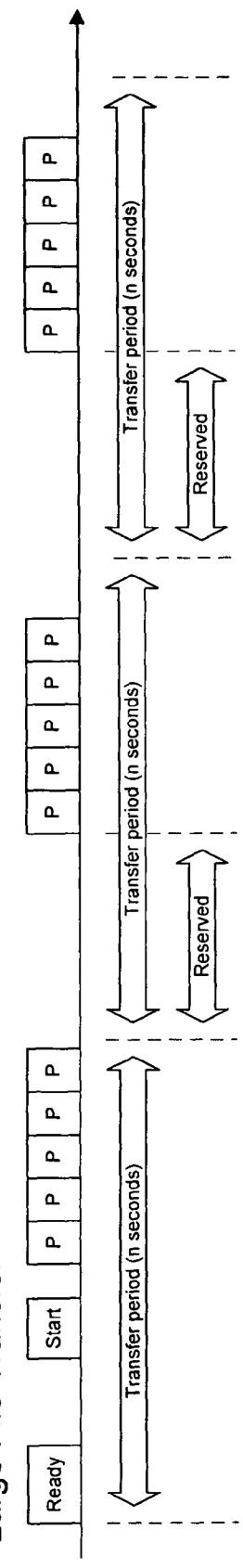
FIG. 6 shows the format of the transmission of long messages, according to another example embodiment of the present invention.

FIG. 5 and FIG. 6 depict a transmission format for short and long messages, according to another example embodiment of the present invention. The system implements the long or short messages depending upon the characteristics of the data to be transferred. For instance, one embodiment uses short messages for all monitoring devices control and status data and long messages for longer data structures like large files. The short messages are limited to a few bytes, while the long messages are used for data structures (or files) having many bytes. For instance, a long message might contain several hundred kilobytes (KB) of video, voice or other data.

A short message is built with 2 types of frames: preamble frames and data frames. Preamble frames are used at the beginning of each message during the acquisition stage of the transmission. The preamble frames include a bit pattern for assisting the receiver in locking onto a transmission as depicted by the "Learn" block of the short message preamble frame. The Learn block shows alternating bits 0 and 1, a common example of such a learning pattern. A received signal strength index measurement can also be achieved by the receiver to discriminate noise (when no transmission is present) from a real carrier. The preamble bits can also be used to determine the bit rate used by the transmitter and to verify that the bit rate corresponds to the expected bit rate. The preamble frame can also contain other types of information. For instance, the preamble may contain system identification bits that permit the receiver to verify that the current signal is originated from a known transmitter. The data frames follow the preamble frames. Typically, much of a data frame is dedicated for data (the "Data1", "Data2" and "Data3" fields) and ends with an error detection field, such as a cyclical-redundancy-check (CRC).

For longer data structures like large files, the message format is changed to allow a better usage of the bandwidth of the radio channel. While short messages can be implemented using variable length structures, the long messages are arranged in fixed length packets. In some instances, the file size can exceed 200 KB and can use a large part of the radio channel time. To maintain equal use of the channels, the long messages are transmitted using packets containing a number of data frames in multiples of the number of channels used by the communications devices. For instance, the system of FIG. 4 uses either 5 or 25 channels for communications because the long packet format has 25 frames and 5 and 25 are the only integer divisors (other than 1) of 25. Thus, when compared to the short message format, the long message format reduces the number of bytes used for communication overhead (e.g., preamble, sync pattern and CRC) in relation to the number of bytes used to transfer the file data. Additionally, the long messages can be implemented using longer frames to reduce the number of channels used to complete the file transfer. Since each change in channel includes a blank time, the total throughput of the transfer can be increased by reducing the number of changes in channels used throughout the file transfer. The advantages of the increased throughput must be balanced against the disadvantages of increasing the dwell time in order to increase the frame size. For example, increasing the dwell time can adversely affect the systems susceptibility to loss of data on a particular channel.

In one embodiment, the short and long message formats are implemented using the method of transmitting data depicted in FIG. 4 and the "Large File Transfer" (LFT) timeline of FIG. 6. The transmitting method is initiated by short messages (e.g., from the source and one from the central device to start the transfer), as depicted by the ready and start blocks of the LFT timeline. The device receiving the large file handles the arbitration for the transmitting method. To increase bandwidth, the receiving device does not send a short message every transfer period. Instead, the receiving device sends a short message periodically (e.g., every "n" seconds) or when a problem occurs with the transmission, such as when the amount of corrupted (lost) frames reaches a given level. The receiving device can request that the lost frames be resent. Thus, during the reserved period, the transmitting device listens for a message from the receiving device. If a short message is not received, the packet transmission resumes after the reserved time is complete.

According to another example embodiment, error recovery methods can be implemented depending upon the size of the data structure. For short messages, a simple redundancy scheme is used. Using the scheme, the transmitting device duplicates selected frames of the transmitted short message within the same packet. When using frequency-hop spread spectrum, the duplicate frames can be such that they are transmitted on different channels to avoid interference on a particular channel. Should a frame and its duplicate be lost, the receiving device can use a negative acknowledge message to request the message or frame be resent.

For large messages, duplicate frames are not transmitted unless the receiving device requests they be retransmitted. Each data frame contains a CRC field for error detection purposes. The receiving device uses the CRC field to detect lost frames and records the lost frames. When the number of lost frames exceeds a given level, the receiving device sends a short message indicating the lost frames using frame and packet numbers. To limit the impact of error in this short message, the frame and packet numbers are grouped in individual data frames (i.e., each data frame contains one frame and one packet number), permitting the error-free part of the short message to be used.

In one embodiment, the monitoring devices have their time period (Rx activation cycle) pre-programmed and stored in Flash memory. During an initialization phase, the monitoring device transmits this period value to the central device, and the central device stores the period in memory. When a transmission is required from the central device to the monitoring device, the central device uses the stored period value to determine the time at which the monitoring device will be listening. This can facilitate communications by avoiding possible communication collisions between monitoring devices and by potentially utilizing more of the transmission period.

In an alternate embodiment, the central device transmits the time period for each monitoring device during an initialization phase. The monitoring device and central device use the transmitted time period for future communications.

In another embodiment of the present invention, individual messages are acknowledged by the recipient. If the sender does not receive a positive acknowledge message or a negative acknowledge message, the sender repeats the original message. To avoid collision between several senders trying to repeat a message, the devices delay their retransmissions. The delays are implemented by each sender to prevent simultaneous retransmissions by several devices. The delays may be implemented using various embodiments. One such embodiment differentiates the delays using a unique address for each device. For instance, one device has an address in binary form equal to 000011 while another device has the binary address equal to 000100. For each repetition, the sender will use a digit of the binary address to determine whether to insert a delay prior to repeating the message. For example, with the original message sent at second n and the binary address=000011:

$1^{st}$ retransmission: 1 second delay (the repetition occurs n+2 seconds)
$2^{nd}$ delay (the repetition occurs n+4 seconds)
$3^{rd}$ retransmission: 0 second delay (the repetition occurs n+5)
$4^{th}$ retransmission: 0 second delay (the repetition occurs n+6)
$5^{th}$ retransmission: 0 second delay (the repetition occurs n+7)
$6^{th}$ retransmission: 0 second delay (the repetition occurs n+8)
Subsequent retransmissions: Repeat sequence starting at $1^{st}$ retransmission.

In another example embodiment, the frequency-hopping table used for channel selection is chosen from several tables stored in each device. During installation, the central device will select one of the several tables. The tables may be selected randomly, or alternatively, they may be selected using a pre-programmed system. One such pre-programmed selection method uses a system identification number to select one of the tables. The monitoring devices use a default table (also known by the panel) until the system identification has been transmitted by the central device. This can be advantageous where several similar systems are used in close proximity with each other allowing for different channel sequences of the various systems.

Within a given system, data can be corrupted when several monitoring devices transmit at the same time. To reduce the probability of corrupted data, messages can be delayed according to their importance or content for a fixed offset time. Alternatively, each monitoring device may be configured to transmit low priority messages during a specified time that is different from the other monitoring devices.

To achieve a high level of security, one embodiment of the system uses cryptographic techniques. At the installation phase, the central device uses a master key (factory set) and a random value to generate a diversified key. The random value is transmitted to the monitoring devices during an initialization phase, and the monitoring devices generate the same diversified key. The central device serial number is used as site identification and is also transmitted to the monitoring devices. A Message Authentication Check (MAC) is calculated for each message. To avoid replay of a previously transmitted message, the diversified key is again diversified using a time counter, so it will evolve every second.

The critical data sent over the air (like arming/disarming codes) is encrypted using a XOR operation with the result of the cryptographic operation. For example, cryptography can be used to generate a 128-bit encrypted string, used for either MAC field having 16 least-significant-bits or for XOR scrambling with all 128 bits.

Figure 7:
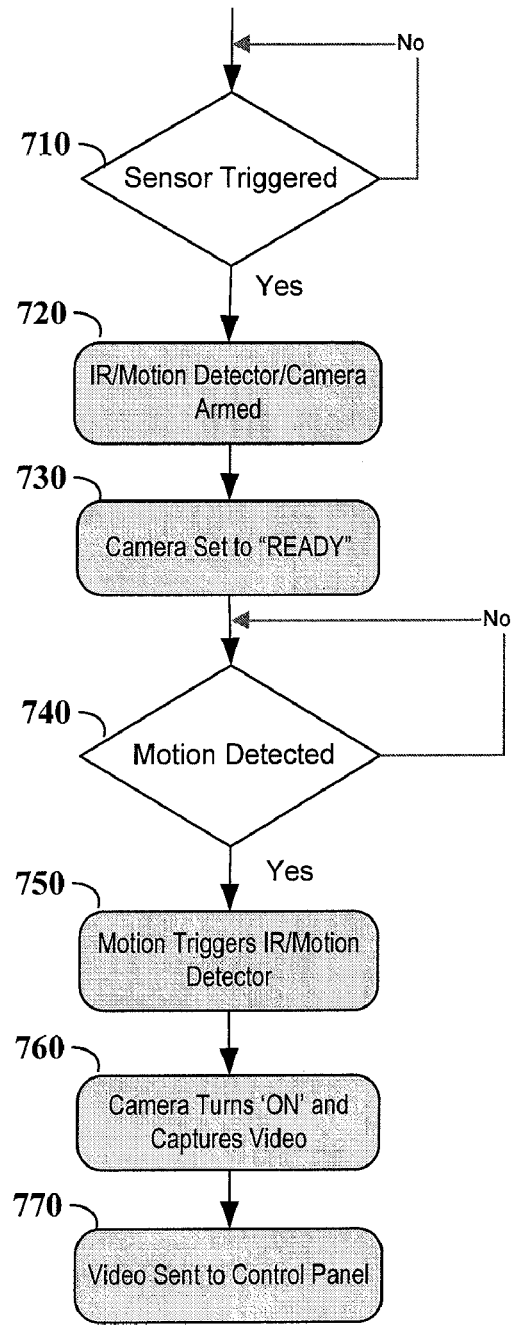
FIG. 7 is a flow diagram of how the motion detection and camera functions of a monitoring device are implemented, according to an example embodiment of the present invention.

FIG. 7 illustrates a process for detecting an intruder, according to an example embodiment of the present invention. The process shown in FIG. 7 may be implemented, for example, using a monitoring system such as that shown in FIG. 1 or otherwise described herein. An intrusion sensor, such as a window or door contact, located at a perimeter of a facility detects whether the contact subject, window or door, has been breached 710. If, for example, a window has been opened, the window contact (intrusion sensor) sends a signal to a corresponding integrated motion sensor/camera located at the interior of the facility. Upon receipt of the intrusion signal, the motion sensor is activated 720 and the integrated camera is set to a "ready" mode without initiating recording 730. The motion detector remains activated 740 and when motion is detected, the integrated motion sensor/camera is again triggered 750. Once motion is detected, the camera turns "on" and captures images of the source of the motion 760. The video images are sent to a central device for further evaluation 770. Further evaluation may include determining (manually or automatically using, e.g., machine visions) whether the source of the motion is human, an animal such as a pet, or another moving object. If the source is determined to be human, further evaluation may reveal whether any identifying images were captured, whether the human is an intruder or an inhabitant of the facility, and face recognition may be used to identify a previously unknown person intruding on the facility.

Figure 8:
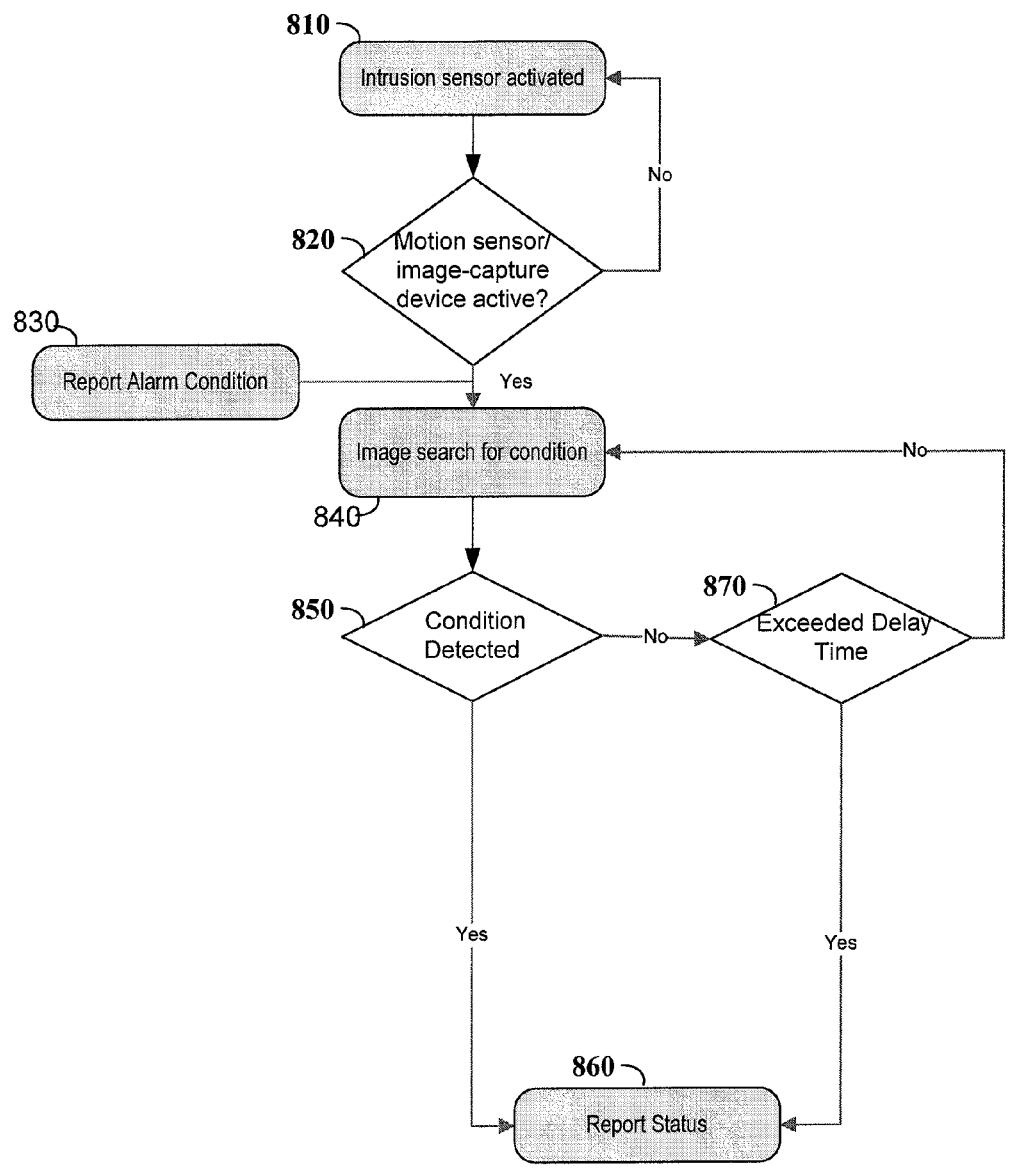
FIG. 8 is a flow diagram of generating a monitor system status report, according to an example embodiment of the present invention.

FIG. 8 illustrates an approach to processing recorded images in a monitoring system, according to another embodiment of the present invention. An intrusion sensor is activated at block 810 when an intruder breaches the perimeter of a facility. If a motion sensor/image-capture device detects motion at block 820, an alarm condition is reported at block 830 and an image search is initiated at block 840. The alarm condition may be transmitted to, for example, a central device, a law enforcement agency, a private security monitoring facility, a cell phone, or a personal computer.

With the image search at block 840 the motion sensor/image-capture device generates video data. The video data is processed at block 850 to evaluate whether the source of the motion is captured in the video data and whether the source of the motion can be identified. For example, if the source is a false trigger such as a pet or authorized employee/inhabitant that was locked out, the system can identify the false trigger and cease further monitoring or alarm activities. If the intruder is recorded, a status report is transmitted to the appropriate authorities at block 860. If the intruder is not detectable, the system determines whether a predetermined amount of time has been exceeded at block 870. If the video data searching has not exceeded the predetermined time delay, the system continues searching the data for images of the intruder. However, if the predetermined time delay has been exceeded, a status report is transmitted and other means are optionally implemented to identify and apprehend the intruder, such as by sounding an alarm and/or alerting authorities or other security personnel.

In another embodiment, the motion detectors, while always powered, are also always in a state of motion sensing. Thus, if motion is detected shortly before an intrusion signal is transmitted, the central device and/or monitoring device can recognize the chain of events as an authorized person within the monitored zone merely opening a window or door. The system is programmed to recognize alternate orders of signal transmission as corresponding to permitted behavior, thereby reducing the potential for the monitoring system creating, and responding to, a false alarm.

In another example embodiment, the home entry intrusion sensor (e.g., front door contact) corresponds to a delayed-response motion sensor such that the motion sensor waits to transmit a signal indicating that motion has been detected to accommodate a monitoring system control keypad located near the entrance. Another zone located nearby, such as a kitchen, includes a standard motion sensor that transmits the signal when motion is detected. The system recognizes that motion sensed in the nearby room (e.g., person setting grocery bags down in the kitchen) following a delayed sensing of motion in the entry zone is likely an authorized user and an alarm will not sound for a predetermined length of time. If the system is not deactivated or reset before the predetermined length of time expires, the alarm will still sound. The number of nearby zones configured with such a relationship with the delayed motion sensor in the entry zone should be limited to ensure that an actual intruder is not provided enough time to traverse the premises without being detected.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. A monitoring system, comprising:
    a central device and monitoring devices having wireless communication therebetween, each of the devices including a wireless communication circuit to effect wireless communications between the central device and the monitoring devices,
    the central device and at least one of the monitoring devices to effect wireless communications therebetween by using communication intervals to define communication therebetween and a sequence of multiple frequencies for communicating between the central device and said at least one monitoring device;
    the central device and said at least one monitoring device configured for synchronizing communications with one another based on the communication intervals and at least a selected one of the multiple frequencies that represents a starting transmission frequency;
    at least one of the central device and said at least one monitoring device configured for reducing power consumption therein as a function of a transmission anticipation time calculated from the communication intervals, the number of frequencies in the sequence of multiple frequencies that are between a receiving frequency of the multiple frequencies that is different from said selected one of the multiple frequencies and said selected one of the multiple frequencies; and
    wherein said at least one of the devices relies on a limited power source and the central device collects monitoring data from the monitoring devices while mitigating power consumption from the limited power source.

2. The monitoring system of claim 1, wherein the central device and the monitoring devices are configured to determine the communication intervals based upon local clocks of the central device and the monitoring devices, and wherein even utilization of the multiple frequencies is effected by selecting a starting transmission frequency that corresponds to a last communication frequency used by the monitoring device.

3. The monitoring system of claim 1, wherein one of the central device and said at least one monitoring device is configured to begin transmitting, at a transmission start time determined based upon a position of the selected one of the multiple frequencies within a sequence of frequencies containing said multiple frequencies and the communication intervals that indicate how long each frequency is used.

4. The monitoring system of claim 3, wherein the other device of the central device and the monitoring devices is configured to activate the wireless communication circuit of the other device as a function of the communication intervals.

5. The monitoring system of claim 1, wherein:
    the multiple frequencies have a set number of frequencies; and
    the wireless communications between the devices is effected using at least short messages having at least a short data frame and long packets having a long data frame, and wherein long packet contains a total number of frames being an integer multiple of the set number of frequencies.

6. The monitoring system of claim 5, wherein the wireless communications are effected for long packets by,
    said at least one monitoring device transmitting a ready message using one or more short messages,
    the central device transmitting a start message using one or more short messages and in response to receiving the ready message, and
    said at least one monitoring device sending long packets continuously during allowed transmission times until the message is complete.

7. The monitoring system of claim 1, wherein said at least one monitoring device is configured to cease sending long packets during a reserved time period and to resume sending long packets after the reserved time period.

8. The monitoring system of claim 7, wherein the central device is configured to transmit a lost frame indication containing a frame number and a packet number using one or more short messages.

9. The monitoring system of claim 3, wherein said sequence of frequencies is selected from a plurality of sequences of frequencies by the central device and information related to said sequence of frequencies is communicated to the monitoring devices during installation of the monitoring system.

10. The monitoring system of claim 1, wherein the monitoring devices are configured to shift the transmission time of a message by a delay time selected from a plurality of delay times, the selected delay time corresponding to a priority of the message.

11. The monitoring system of claim 1, further comprising:
    a motion sensor to sense movement;
    an image-capture device to capture images in response to an event indication from an event sensor and to a movement indication from the motion sensor; and
    a base unit integrating a direction of view of the motion sensor and of the image-capture device and thereby directing the motion sensor to sense in the target area in which the images are captured by the image-capture device.

12. The monitoring system of claim 11, wherein an intrusion sensor is configured to generate a signal that arms the motion sensor in response to sensing the intrusion.

13. The monitoring system of claim 11, further including an electronic circuit to operate the motion sensor to control the power consumption of the motion sensor and the image-capture device and to process the captured images.

14. The monitoring system of claim 13, further including a housing to contain the base unit, the power supply, the electronic circuit, the motion sensor and the image-capture device.

15. The monitoring system of claim 11, further including a housing to contain the base unit, the motion sensor and the image-capture device.

16. For use in a monitoring system, a method for wireless communication between a central device and monitoring devices, each of the devices including a wireless communication circuit to effect wireless communications between the central device and the monitoring devices, the method comprising:
to effect wireless communications between the central device and at least one of the monitoring devices, providing
communication intervals to define communication therebetween, and
a selected one of a sequence of multiple frequencies for communicating between the central device and said at least one monitoring device;
communicating between the central device and said at least one monitoring device based on the communication intervals and at least said selected one of the multiple frequencies; and
reducing power consumption of a reduced power mode, in at least one of the central device and said at least one monitoring devices as a function of the communication intervals and said selected one of the multiple frequencies, including reducing an amount of time that the at least one of the central device and said at least one monitoring device actively listens for data transmitted using the sequence of multiple frequencies, by reducing a number of communication intervals during which the at least one monitoring device actively listens to less than a number of frequencies in the multiple frequencies; and
wherein said at least one of the devices relies on a limited power source and the central device collects monitoring data from the monitoring devices while mitigating power consumption from the limited power source.

17. The method of claim 16, wherein the step of reducing power consumption is also a function of a sequence of the multiple frequencies and a second selected one of the multiple frequencies.

18. The method of claim 17, further including the step of communicating, between the central device and the monitoring devices, data representing a current time index that is used as a reference for establishing communication timings between the devices.

19. The method of claim 16, wherein said selected one of the multiple frequencies corresponds to an initial frequency for receiving wireless communications from said at least one monitoring device.

20. The method of claim 16, wherein the effecting wireless communications between the central device and the monitoring devices is implemented using frequency-hopping spread spectrum.

21. The method of claim 20, further including the step of synchronizing the central device and monitoring devices using periodic wireless communications and a local clock circuit for each of the central device and monitoring devices.

22. The method of claim 16, further including the steps of:
calculating a transmission anticipation time from,
a sequence of the multiple frequencies used for communications between the central device and monitoring devices,
the number of frequencies in the sequence between said selected one of the multiple frequencies and a current transmission frequency of the multiple frequencies,
the dwell time of the central device and monitoring devices, and
the blank time of the central device and monitoring devices; and
transmitting in response to the transmission anticipation time and an expected activation time of the central device.

23. The method of claim 16, further including the step of transmitting messages between the devices wherein the messages use a short frame and a long frame.

24. The method of claim 18 further including the steps of:
detecting a loss of synchronization between the central device and said at least one of the monitoring devices; and
increasing a receive activation time of one of the devices in response to the detection.

25. For use in a monitoring system, a method for wireless communication between a central device and monitoring devices, each of the devices including a wireless communication circuit to effect wireless communications between the central device and the monitoring devices, the method comprising:
to effect wireless communications between the central device and at least one of the monitoring devices, providing
communication intervals to define communication therebetween, and
a selected one of a sequence of multiple frequencies for communicating between the central device and said at least one monitoring device;
communicating between the central device and said at least one monitoring device based on the communication intervals and at least said selected one of the multiple frequencies; and
reducing power consumption of a reduced power mode, in at least one of the central device and said at least one monitoring device as a function of the communication intervals and said selected one of the multiple frequencies, including reducing an amount of time that the at least one of the central device and said at least one monitoring device actively listens for data transmitted using the sequence of multiple frequencies;
wherein said at least one of the devices relies on a limited power source and the central device collects monitoring data from the monitoring devices while mitigating power consumption from the limited power source; and
transmitting messages between the devices wherein the messages use a short frame and a long frame; and
transmitting the long frames in packets that contain a number of frames that is an integer multiple of the number of different frequencies of said multiple frequencies.

26. For use in a monitoring system, a method for bidirectional wireless communication between a central device and monitoring devices, each of the devices including a wireless communication circuit to effect wireless communications between the central device and the monitoring devices, the method comprising:
wirelessly sending synchronization information between the central device and at least one of the monitoring devices;
using a selected channel for communication between the central device and said at least one of the monitoring devices to effect wireless communications between the central device and said at least one of the monitoring devices, the selected channel used to effect approximately even utilization of a sequence of channels by selecting the channel according to a last communication channel used to communicate between the central device and the at least one of the monitoring devices;

reducing the power consumption of at least one of the wireless communication circuits by coordinating a communications time interval and the selected channel using the location of the selected channel within sequence of channels to calculate the communications time interval; and wherein the sequence of channels is used for wireless communications between the central device and the monitoring devices and said at least one of the devices relies on a limited power source and the central device collects monitoring data from the monitoring devices while mitigating power consumption from the limited power source.

* * * * *

UNITED STATES PATENT AND TRADEMARK OFFICE
CERTIFICATE OF CORRECTION

| | | |
|---|---|---|
| PATENT NO. | : 8,155,105 B2 | Page 1 of 1 |
| APPLICATION NO. | : 11/389674 | |
| DATED | : April 10, 2012 | |
| INVENTOR(S) | : Reibel et al. | |

It is certified that error appears in the above-identified patent and that said Letters Patent is hereby corrected as shown below:

In the Claims

Col. 19, line 26, claim 16: "monitoring devices as a function" should read --monitoring device, as a function--.

Signed and Sealed this
Twelfth Day of November, 2013

Teresa Stanek Rea
*Deputy Director of the United States Patent and Trademark Office*